(12) United States Patent
    Kim

(10) Patent No.: US 11,443,652 B2
(45) Date of Patent: Sep. 13, 2022

(54) TERMINAL AND SYSTEM FOR LEARNING ARTIST'S STYLE

(71) Applicant: Pabloarts Company Inc., Seoul (KR)

(72) Inventor: Jin-a Kim, Sejong-si (KR)

(73) Assignee: Pabloarts Company Inc., Seoul (KR)

( * ) Notice: Subject to any disclaimer, the term of this patent is extended or adjusted under 35 U.S.C. 154(b) by 0 days.

(21) Appl. No.: 17/109,561

(22) Filed: Dec. 2, 2020

(65) Prior Publication Data

US 2022/0172636 A1    Jun. 2, 2022

(51) Int. Cl.
   *G09B 11/00*     (2006.01)
   *G06F 3/04883*   (2022.01)
   *G09B 5/02*      (2006.01)
   *G06F 3/0482*    (2013.01)

(52) U.S. Cl.
   CPC .......... *G09B 11/00* (2013.01); *G06F 3/04883* (2013.01); *G09B 5/02* (2013.01); *G06F 3/0482* (2013.01); *G06F 2203/04803* (2013.01)

(58) Field of Classification Search
   CPC ......... G09B 11/00; G09B 11/04; G09B 11/06; B43L 13/20
   See application file for complete search history.

(56) References Cited

U.S. PATENT DOCUMENTS

| | | | | |
|---|---|---|---|---|
| 5,252,073 A | * | 10/1993 | Brotz | G09B 11/06 434/81 |
| 5,513,991 A | * | 5/1996 | Reynolds | G09B 7/04 348/61 |
| 5,604,517 A | * | 2/1997 | Filo | G06F 3/0488 345/173 |
| 6,021,417 A | * | 2/2000 | Massarksy | G06T 11/001 345/441 |
| 6,572,378 B1 | * | 6/2003 | Rehkemper | G09B 11/04 345/173 |
| 9,285,903 B1 | * | 3/2016 | Yun | G06F 3/04883 |
| 2018/0268730 A1 | * | 9/2018 | Chelel | G09B 11/04 |
| 2018/0280809 A1 | * | 10/2018 | Martin | A63F 13/211 |
| 2019/0333405 A1 | * | 10/2019 | Gherman | G06K 9/00684 |
| 2020/0082583 A1 | * | 3/2020 | Williford | G06F 3/04883 |

FOREIGN PATENT DOCUMENTS

| | | |
|---|---|---|
| JP | 2015-082295 A | 4/2015 |
| KR | 10-0710037 B1 | 4/2007 |
| KR | 10-2015-0010898 A | 1/2015 |
| KR | 10-2017-0098617 A | 8/2017 |
| KR | 10-2018-0118270 A | 10/2018 |

* cited by examiner

*Primary Examiner* — Peter R Egloff
(74) *Attorney, Agent, or Firm* — Fenwick & West LLP

(57) ABSTRACT

A system for learning an artist's style includes an artist database unit, a pupil gallery unit, an artist image providing unit to display an artist's content selected from the artist database unit, a pupil learning unit in which at least one smart layer and at least one user layer are overlaid and displayed, the at least one smart layer generated based on the elements of art that make up the selected artist's content and the at least one user layer providing an interface for recognizing a user input and supporting the writing or drawing, and a storage unit to store some or all of the at least one user layer as a pupil artwork in a portfolio.

9 Claims, 15 Drawing Sheets

TERMINAL AND SYSTEM FOR LEARNING ARTIST'S STYLE

BACKGROUND

1. Field

The present disclosure relates to a terminal or system for learning an artist's calligraphy, painting or artwork.

2. Description of the Related Art

Cartoons or calligraphy have been only provided via printing media on offline, but recently, with the development of computer graphics and multimedia devices using the same, artists easily create a variety of desired images using tools and people enjoy webtoon that is the compound word of web and cartoon via an Internet. However, there are temporal and physical limitations in learning webtoon, painting and calligraphy directly from artists.

SUMMARY

One embodiment of the present disclosure proposes a method for learning various artworks using a terminal without temporal and spatial limitations.

In one embodiment of the present disclosure, a terminal for learning an artist's style includes an artist image providing unit to display an artist's content selected from an artist database unit in which at least one content created for each artist is stored; a pupil learning unit in which at least one smart layer and at least one user layer are overlaid and displayed, the at least one smart layer generated based on the elements of art that make up the selected artist's content, the at least one user layer providing an interface for recognizing a user input and supporting the writing or drawing; a storage unit to store some or all of the at least one user layer as a pupil artwork in a portfolio; a display unit to display the selected artist's content in the artist image providing unit on a first split screen and the at least one smart layer and the at least one user layer of the pupil learning unit on a second split screen; and a sharing interface unit to share a pupil artwork related to the at least one content created for each artist through at least one of a pupil gallery unit, Social Network Service (SNS) or Short Message Service (SMS), the pupil gallery unit in which the pupil artwork is stored by artist. In this case, the at least one content includes a picture, a painting, a cartoon, a webtoon and calligraphy.

As an embodiment of the present disclosure, a type of the selected artist's content includes a video generated by recording an artwork creating process of the selected artist, and a slide generated by time-sequentially recording an artwork creating process of the selected artist.

As an embodiment of the present disclosure, the at least one smart layer displayed on the second split screen includes a layout generated by further referring to feature points extracted from an image at a specific time to of the video or the slide.

As an embodiment of the present disclosure, the at least one smart layer displayed on the second split screen further includes pattern information recognized in the feature points extracted from the video or the slide, and the pattern information is recognized through machine learning.

As another embodiment of the present disclosure, a system for learning an artist's style includes an artist database unit to store at least one content created for each artist; a pupil gallery unit to store a pupil artwork related to the at least one content created for each artist by artist; an artist image providing unit to display an artist's content selected from the artist database unit; a pupil learning unit in which at least one smart layer and at least one user layer are overlaid and displayed, the at least one smart layer generated based on the elements of art that make up the selected artist's content, the at least one user layer providing an interface for recognizing a user input and supporting the writing or drawing; and a storage unit to store some or all of the at least one user layer as a pupil artwork in a portfolio.

As an embodiment of the present disclosure, the storage unit further stores the layout displayed on the smart layer in the pupil learning unit and a recording of a learning process in which a user learns along the layout displayed on the smart layer using the interface provided in the user layer, and in this case, each of the smart layer or the user layer is at least one.

As an embodiment of the present disclosure, the system for learning an artist's style further includes a billing unit to carry out billing when an artist's paid content is selected from the artist database unit or the pupil artwork or the recording is shared in the pupil gallery unit and paid feedback is received from a related artist.

As an embodiment of the present disclosure, the system for learning an artist's style further includes a sharing unit to share the pupil artwork in at least one of the pupil gallery unit, social network service (SNS) or short message service (SMS), and the pupil gallery unit may display feedback from an original artist and other pupils for each pupil artwork.

As an embodiment of the present disclosure, a first screen displays the selected artist's content and a second screen displays the at least one smart layer and the at least one user layer provided by the pupil learning unit, and the at least one smart layer displayed on the second screen includes at least part of the layout generated based on the elements of art of the selected artist's content displayed on the first screen.

The terminal and system for learning an artist's style according to the present disclosure provide a smart layer reflecting the elements of art for each artwork of an artist to learn the artist's style, thereby allowing a user or pupil to learn the elements of art of the artist.

The terminal and system for learning an artist's style according to the present disclosure allows the user to learn regardless of time and place.

The terminal and system for learning an artist's style according to the present disclosure allow the user to trace a desired picture using the smart layer in which a layout is formed by features points extracted from an image captured by the user.

The terminal and system for learning an artist's style according to the present disclosure automatically records the user's creating and learning process to generate a video so that the artwork is shared and the user receives feedback from the original artist or opinions from other pupils, thereby improving the learning effect. Additionally, it is possible to share the artwork created by the user in the pupil gallery and receive critique and response.

DETAILED DESCRIPTION

The advantages and features of the present disclosure and methods for achieving them will be apparent from the embodiments described in detail together with the accompanying drawings. However, the present disclosure is not limited to the disclosed embodiments and may be embodied in various other forms, and these embodiments are provided so that this disclosure will be thorough and complete, and help those skilled in the art to fully understand the scope of the present disclosure, and the present disclosure will be defined by the scope of the appended claims.

Hereinafter, the embodiments of the present disclosure will be described in detail with reference to the accompanying drawings.

Figure 1:
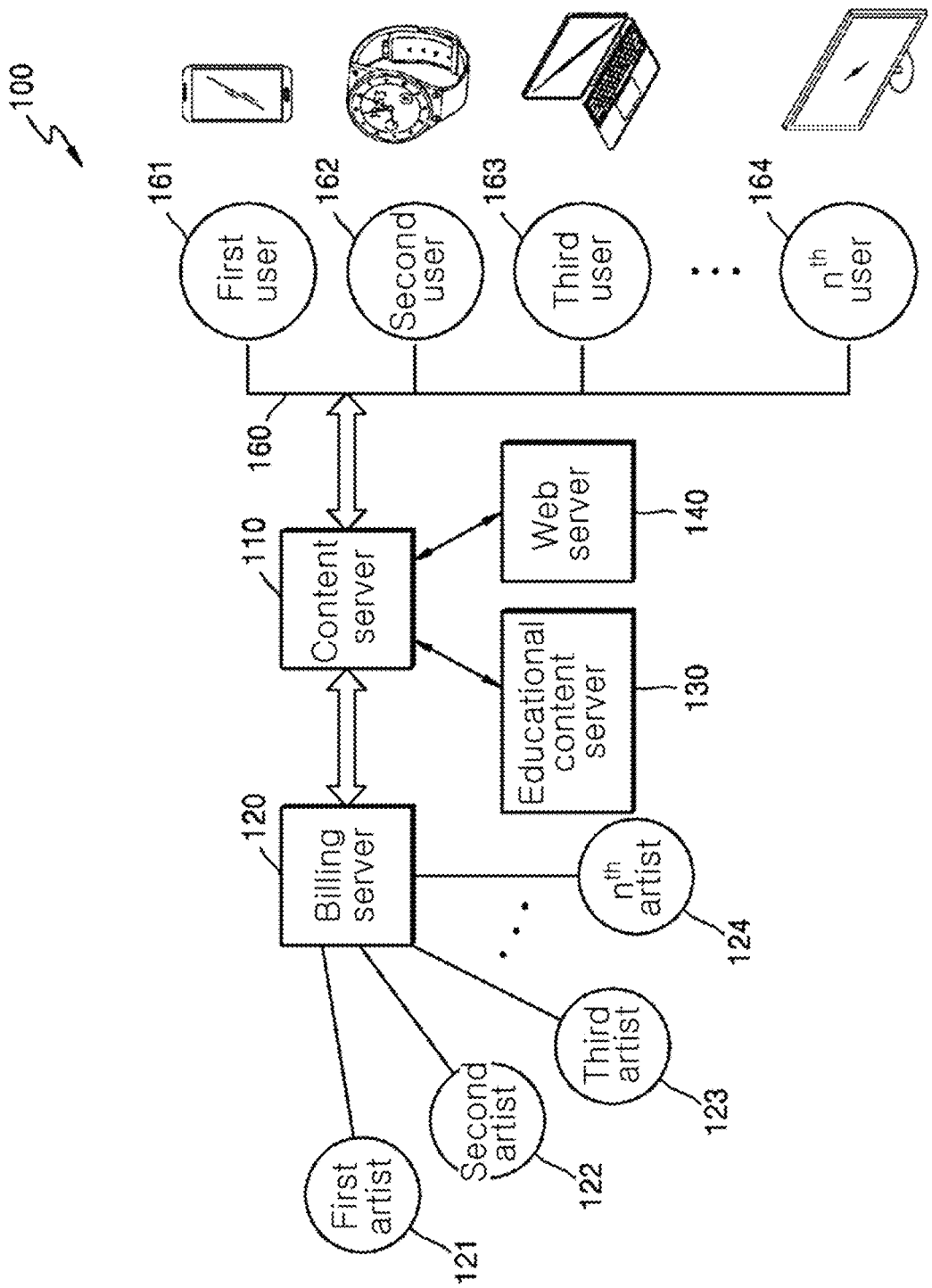
FIG. 1 shows the internal architecture diagram of a system 100 for learning an artist's style as an embodiment of the present disclosure.

FIG. 1 shows the internal architecture diagram of a system 100 for learning an artist's style as an embodiment of the present disclosure.

The system 100 for learning an artist's style includes a content server 110, a billing server 120, an educational content server 130, a web server 140, and user terminals 160, 161, 162, 163, 164. The content server 110 may communicate with the billing server 120 wired or wirelessly, and pay the cost to each artist 121, 122, 123, 124 and receive commission from each artist 121, 122, 123, 124 using the billing server 120.

When users 160, 161, 162, 163, 164 download paid artworks of the artists 121, 122, 123, 124 or request paid feedback from the artists 121, 122, 123, 124, the billing server 120 is implemented to carry out billing and charging between the user terminals 160, 161, 162, 163, 164 and the artists 121, 122, 123, 124 in the transaction involved in costs according to a preset policy. The billing function may be implemented on the billing server 120, but may be also implemented on the content server 110 or the user terminals 160, 161, 162, 163, 164 in the form of an application or a web. Although not shown, the billing function may be also applied when data or information of the educational content server 130 and the web server 140 are used.

The content server 110 may communicate various servers such as the educational content server 130 and the web server 140. Additionally, each artist may upload or provide his/her artwork to the educational content server 130 and the web server 140.

The user terminals 160, 161, 162, 163, 164 include a mobile phone, a smart phone, a tablet, a laptop computer, a PC, a smart watch, a smart TV, a wearable device, a handheld device, a terminal with a foldable display and a robot, and may include all terminals with a touch type display and a processor.

In an embodiment of the present disclosure, the artist's style is used to refer to the artist's art style, the artist's painting style, the artist's calligraphy style and the artist's artwork style.

Figure 2:
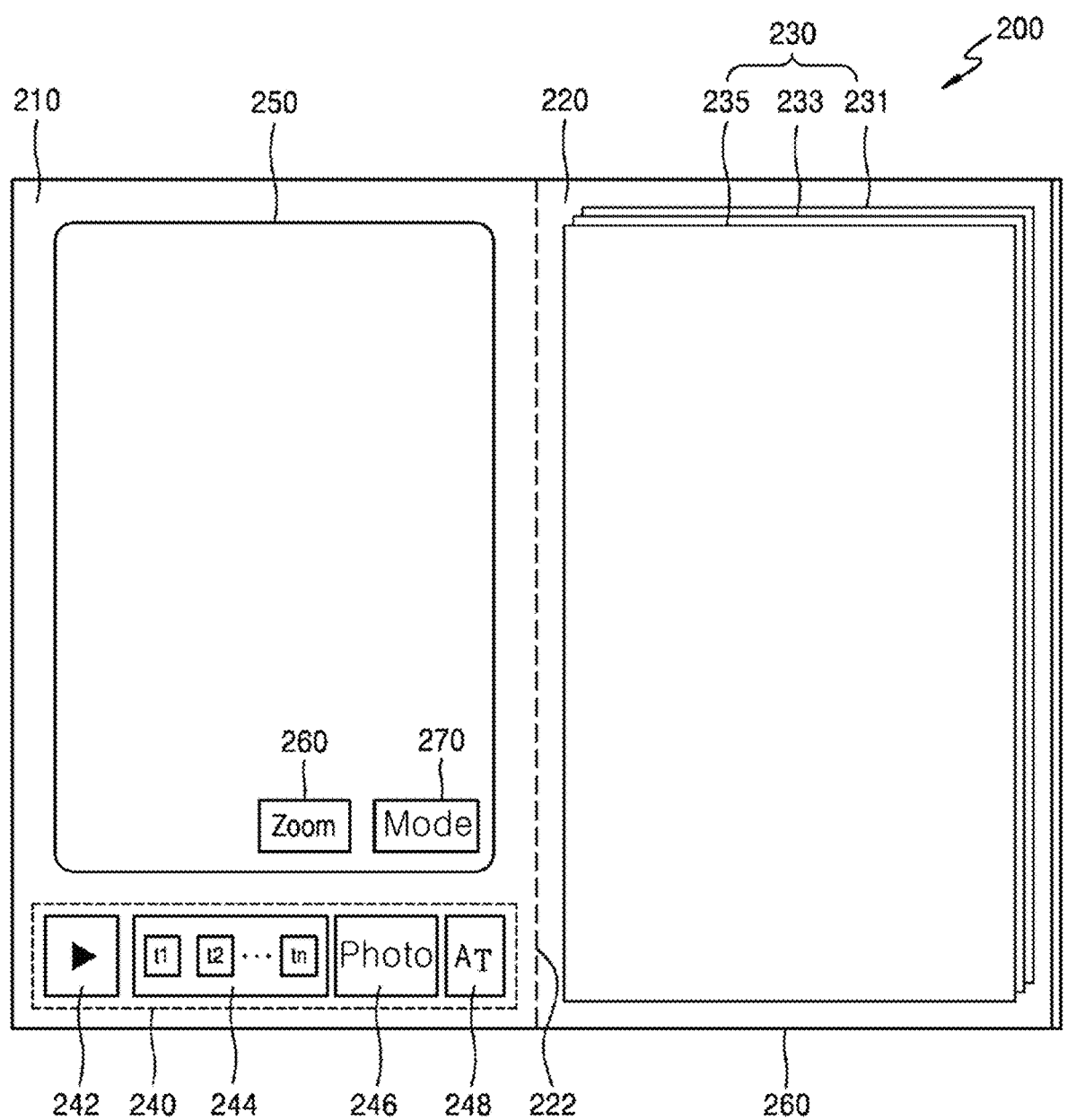
FIG. 2 shows an example of a terminal 200 for learning an artist's style as an embodiment of the present disclosure.

FIG. 2 shows an example of a terminal 200 for learning an artist's style as an embodiment of the present disclosure.

The terminal 200 for learning an artist's style includes an artist image providing unit 250, a pupil learning unit 230, a storage unit (not shown) and a display unit 260. Additionally, the terminal 200 for learning an artist's style may further include a sharing interface unit (not shown) to share a pupil's artwork stored in the storage unit through at least one of a pupil gallery unit, social network service (SNS) or short message service (SMS).

The artist image providing unit 250 displays an artist's content selected from an artist database unit that stores at least one content created for each artist. The artist's content includes compatible data into a format of a video, slide, photo and image file. Referring to FIG. 1, the artist database unit may be implemented in the form of the content server 110, the educational content server 130 and the web server 140, and includes all database units of similar types.

The pupil learning unit 230 provides a smart layer or a user layer. In the pupil learning unit 230, the user may overlay the user layer 233 on the smart layer 231, and the user may learn to draw or write or the like along the sketch displayed on the smart layer 231 in the user layer 233 where necessary. For example, the user may add another smart layer 235 or another user layer 235 on the user layer 233 where necessary.

Figure 4A:
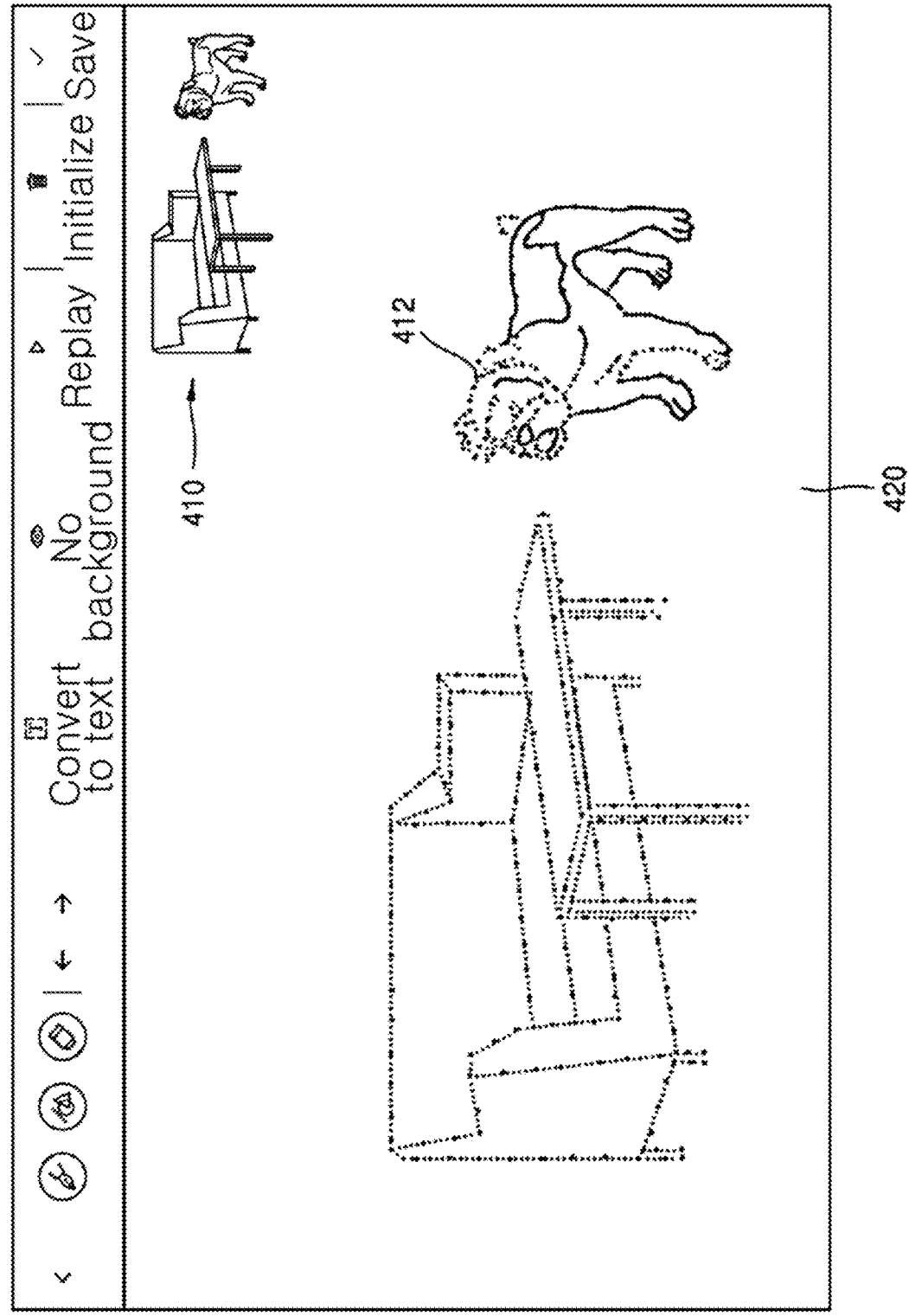
FIGS. 4A and 4B show an embodiment of a smart layer generated based on the elements of art as an embodiment of the present disclosure.
Figure 4B:
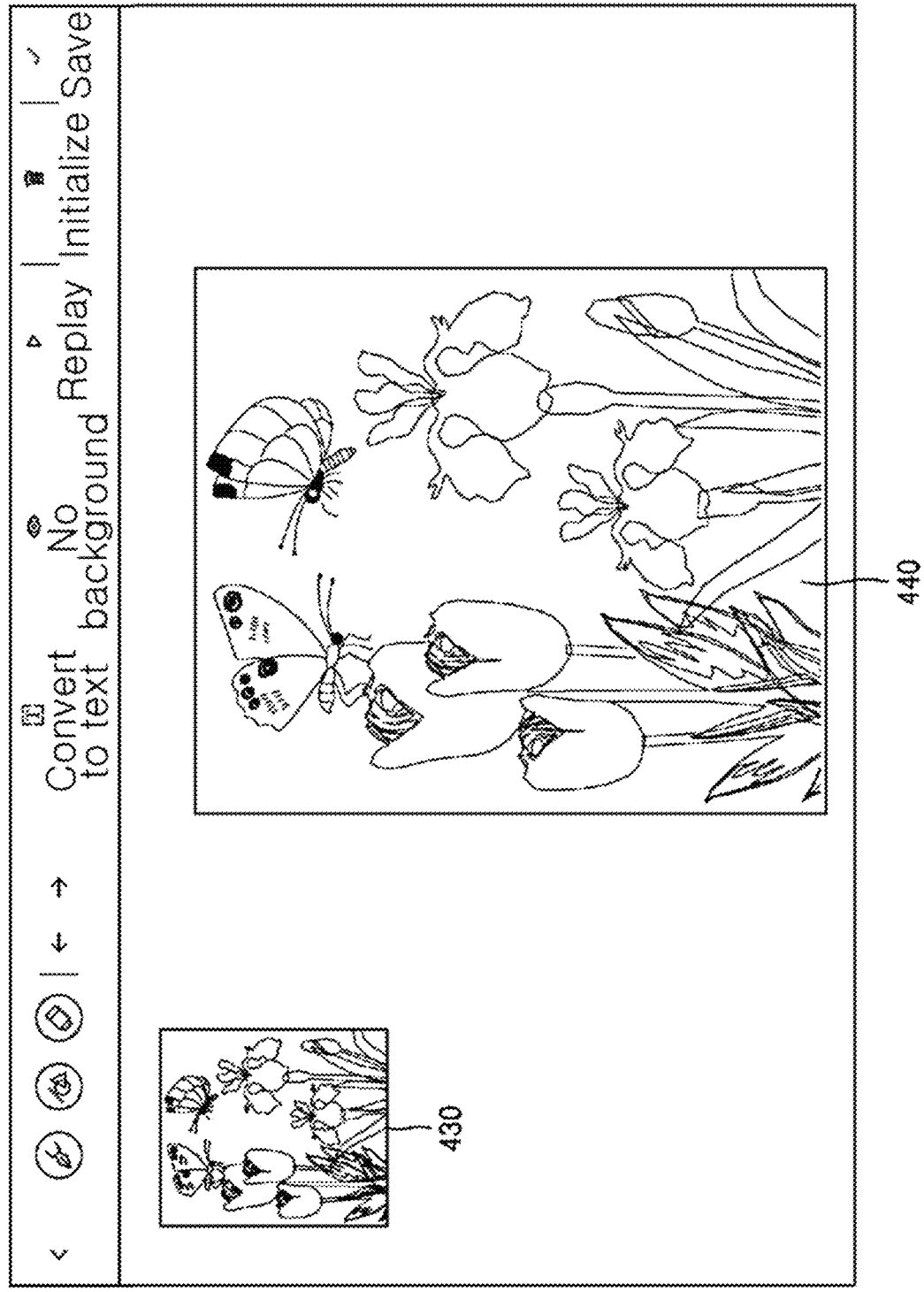

As an embodiment of the present disclosure, the smart layer is a guideline that helps the user to learn to draw or write, and includes the shape of sketch or outline, as in the embodiment of FIG. 4A or 4B.

The smart layer may further include pattern information recognized in feature points extracted from the video or slide. In this case, the pattern information is recognized through machine learning. For example, when M still images are extracted from the video between t1 and tn, the smart layer may be prepared using the pattern information recognized in at least some of the M still images. The pattern information includes human position ratios, color information and shade information.

Figure 5:
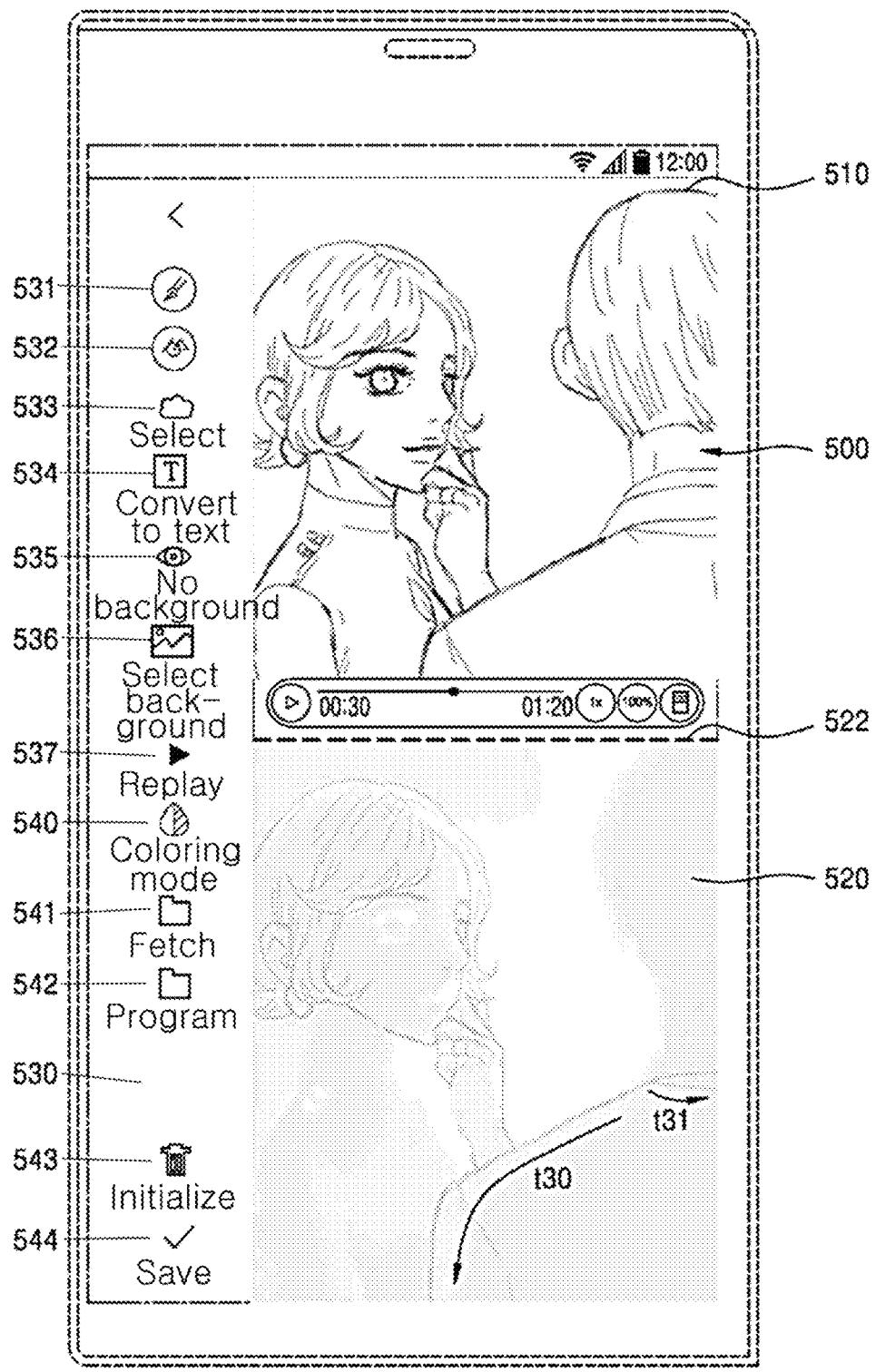
FIGS. 5 and 11 show an example of a process of learning an artist's style by learning a video of the artist's artwork creation process on the terminal 200 for learning an artist's style as an embodiment of the present disclosure.

As an embodiment of the present disclosure, the smart layer is generated based on the elements of art that make up the selected artist's content provided by the artist image providing unit 250. Referring to FIG. 5, the smart layer 520 is generated based on the elements of art that make up the selected artist's content 510 provided by the artist image providing unit 510. In more detail, in FIG. 5, the smart layer 520 displays a layout corresponding to a line among the elements of art of the image at the time to provided by the artist image providing unit 510, and further displays guides t30, t31 indicating an order of drawing the layout corresponding to the line. The user may overlay the user layer on the smart layer 520, and draw the line at t30 and then the line at t31 along the guides displayed on the smart layer 520.

As another embodiment of the present disclosure, when the user wants to learn color among the elements of art of the image at the time tp provided by the artist image providing unit 510, the pupil learning unit 230 may further provide a smart layer generated based on a new color.

As an embodiment of the present disclosure, the pupil learning unit 230 may be implemented to control a write or draw interface to be inactivated in the smart layer in part or in whole and to be only activated in the user layer.

The display unit 260 may display the artist image providing unit 250 on a first split screen and the pupil learning unit 230 on a second split screen.

Figure 9:
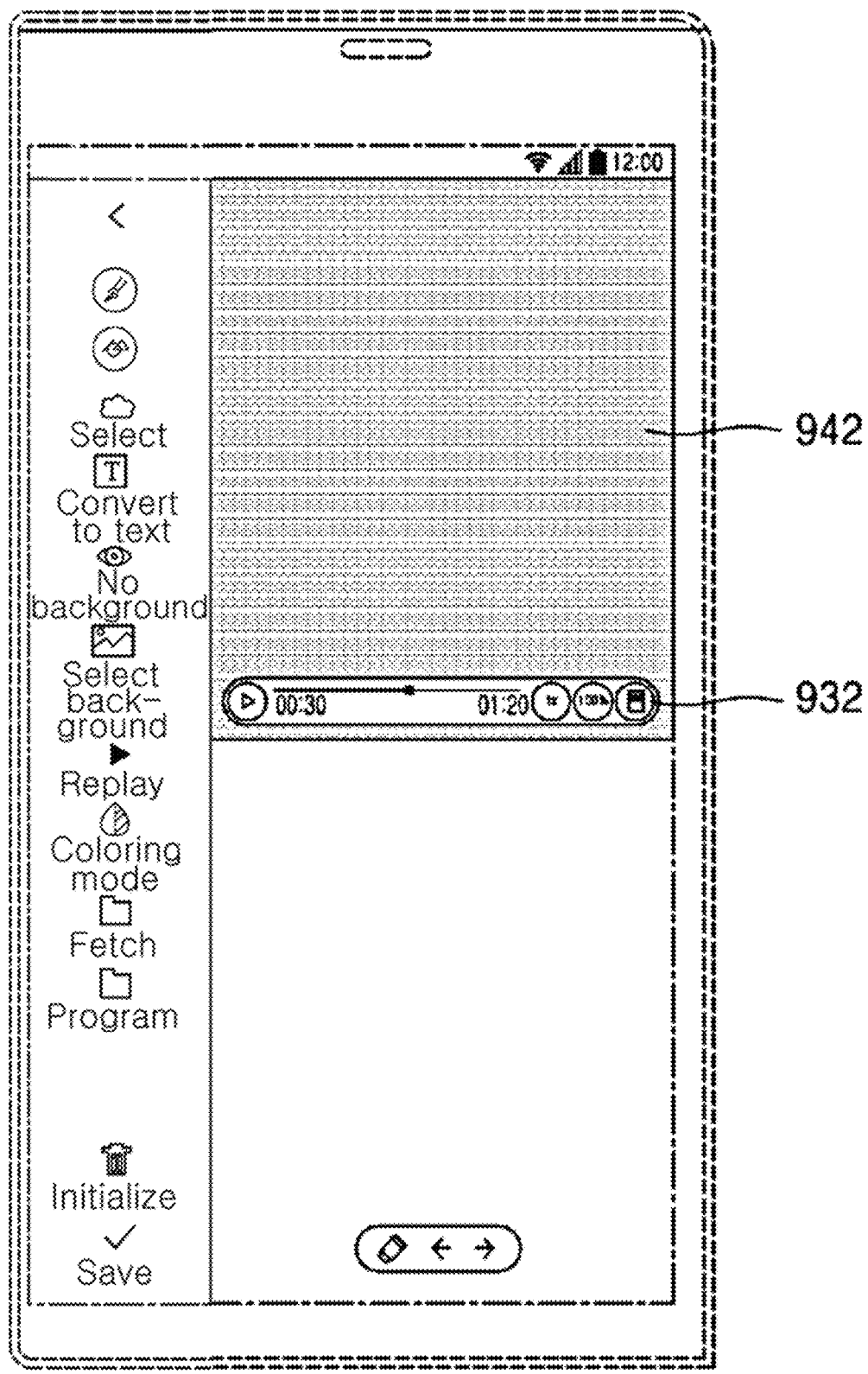
Figure 10:
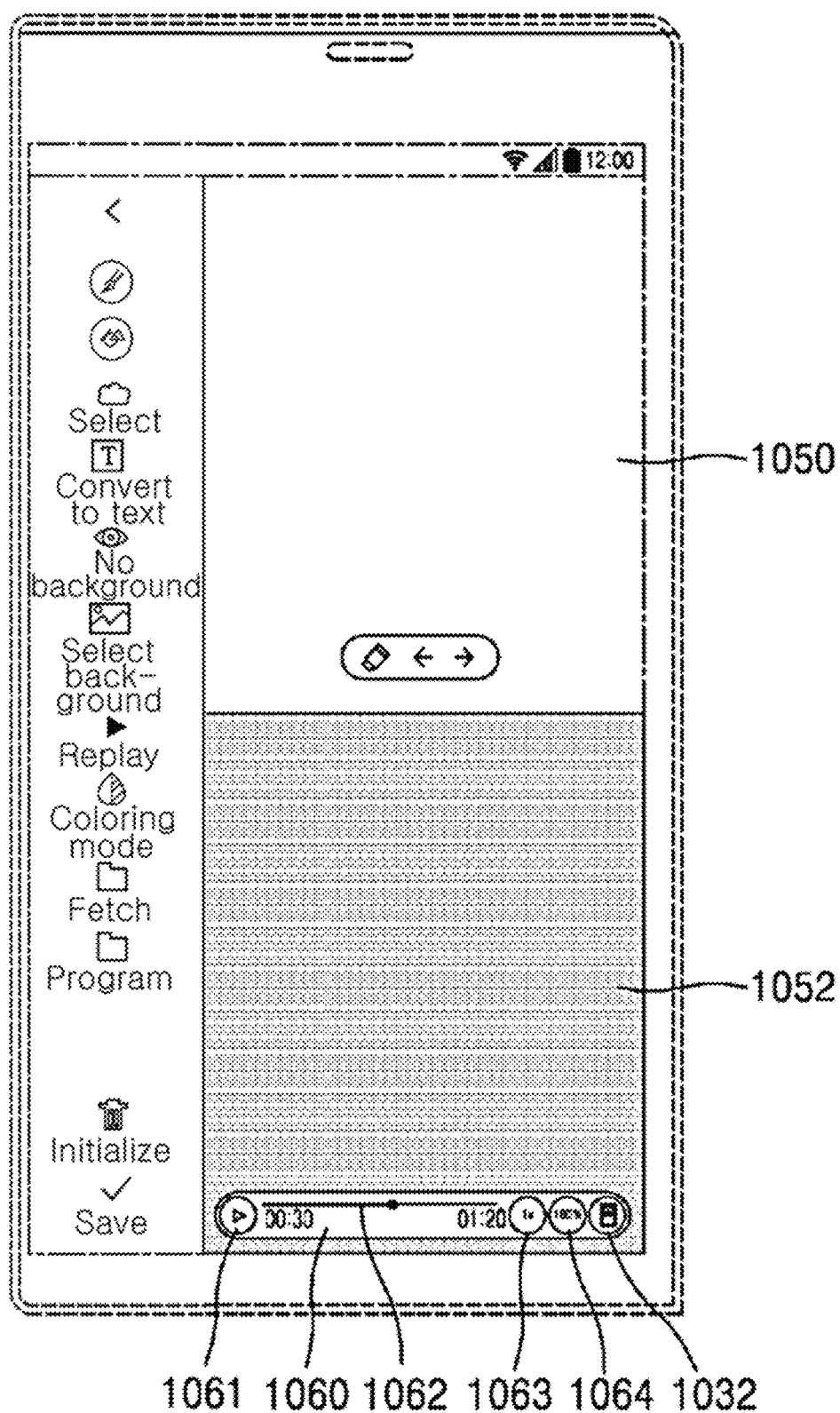

Referring to FIGS. 9 and 10, the artist image providing unit 942, 1052 may display the artist's video on the upper part (FIG. 9) or lower part (FIG. 10) of the display. Also, the pupil learning unit 230 is disposed at the lower part or the upper part of the display, and provides the smart layer or user layer. In another embodiment of the present disclosure, when a plurality of terminals is used, a display of a first terminal may be used as the first split screen and a display of a second terminal may be used as the second split screen.

In the embodiment of FIG. 2, for convenience of description, the left side of a split line 222 is referred to the first split screen 210, and the right side is referred to as the second split screen 220. In this case, the size of the first split screen and the second split screen may be split through the split line 222. Although FIG. 2 shows the split line 222 visibly for convenience of description, the split line 222 includes all points that split the screen in a visible or invisible form. Additionally, the split line 222 may move in the leftward and rightward and upward and downward directions, and various other directions.

The first split screen 210 may further include the artist image providing unit 250 and a content selection interface 240 to select the content displayed on the artist image providing unit 250. Additionally, the first split screen 210 may further include a zoom interface 260 and a mode change interface unit 270 to enlarge or reduce the displayed content.

Although FIG. 2 shows the content selection interface 240 and the artist image providing unit 250 separated from each other, the content selection interface 240 may be overlaid and displayed on the artist image providing unit 250.

The content selection interface 240 provides an interface for selecting the content 248 of a type that can be displayed or replayed in the format of the video 242, the slide 244, the photo 246 or other images or videos. The mode change interface unit 270 operates to change the location of the first split screen 210 or make the first split screen 210 disappear according to how many times or how long the user touches.

Referring to FIGS. 9 and 10 in relation to the function of the mode change interface unit 270, the artist image providing unit 942, 1052 is located at the upper part (FIG. 9) or the lower part (FIG. 10), or disappears from the display according to the number of touches on the mode change interface unit 932, 1032. The figures show embodiments of the present disclosure, and it is noted that the location of the artist image providing unit 250 may be variously changed to the left or right side, or leftward or rightward diagonal according to the number of touches or the touch time on the mode change interface unit 270.

The storage unit may store some or all of at least one user layer as a pupil artwork in a portfolio (320 in FIG. 3). The storage unit may further store a recording of the user or pupil's learning process in the user layer in the pupil learning unit. The user may share the pupil artwork or recording in the pupil gallery unit 310 using the sharing interface unit.

Figure 3A:
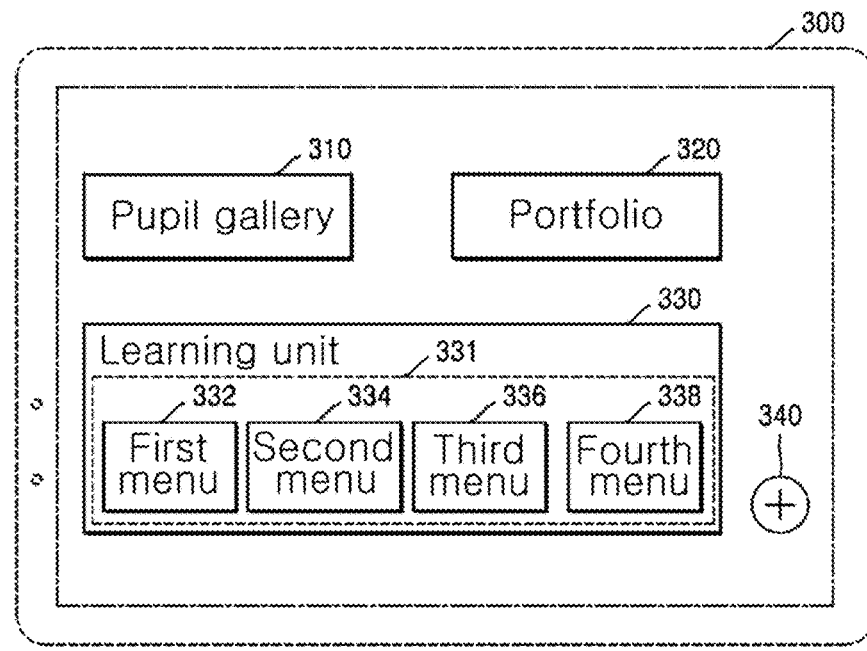
FIGS. 3A and 3B show an example of a terminal 300 for learning an artist's style as another embodiment of the present disclosure.
Figure 3B:
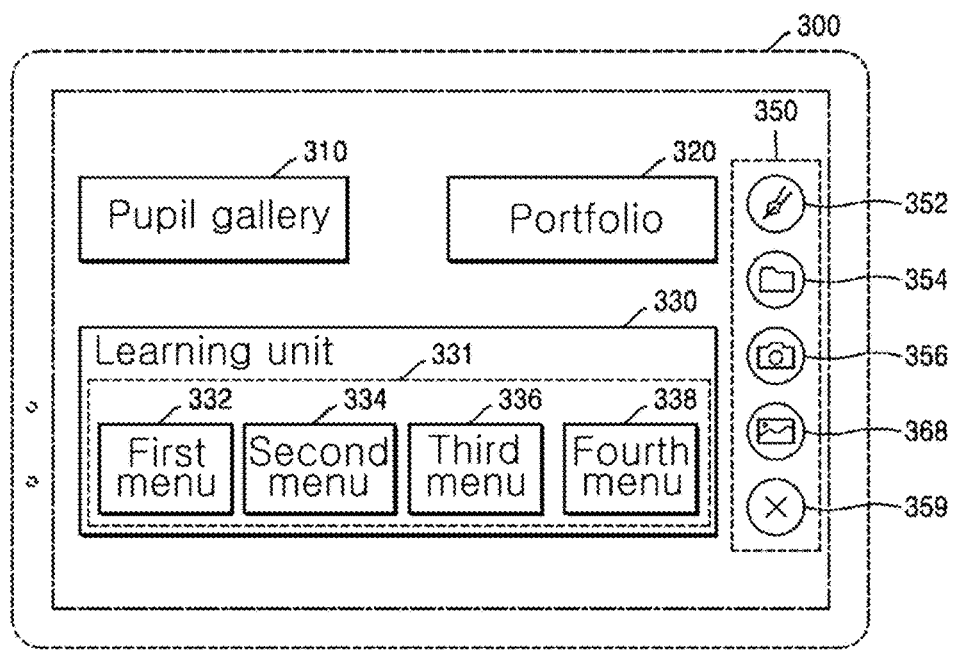

FIGS. 3A and 3B show an example of a terminal 300 for learning an artist's style as another embodiment of the present disclosure.

The terminal 300 for learning an artist's style includes a pupil gallery unit 310, a portfolio unit 320, a learning unit 330 and an extension interface 340. The learning unit 330 includes all the functions of the pupil learning unit 230 of FIG. 2.

The pupil gallery unit 310 stores various pupil artworks related to at least one content created for each artist by artist. The portfolio unit 320 stores the user's artworks including paintings, webtoons and calligraphy created by the user.

Figure 12:
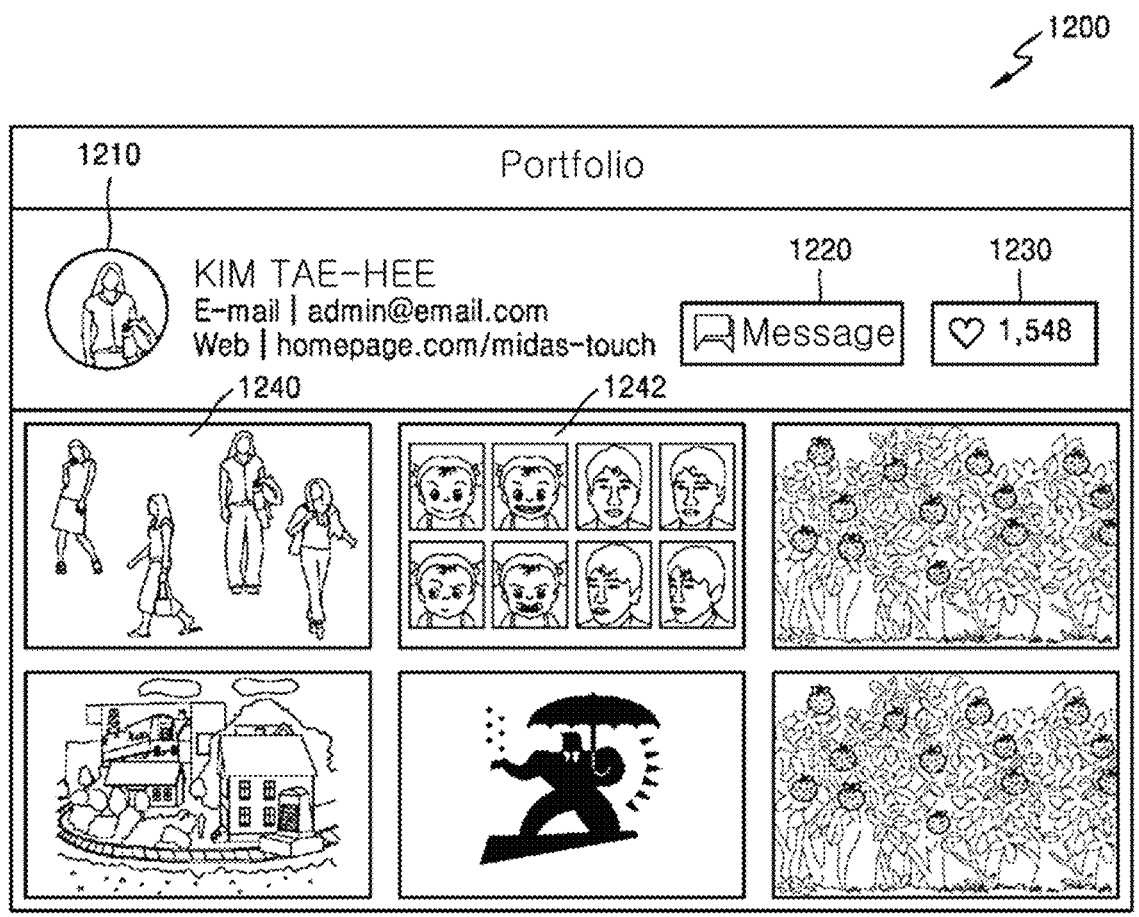
FIG. 12 shows an example of a portfolio unit as an embodiment of the present disclosure.
Figure 13:
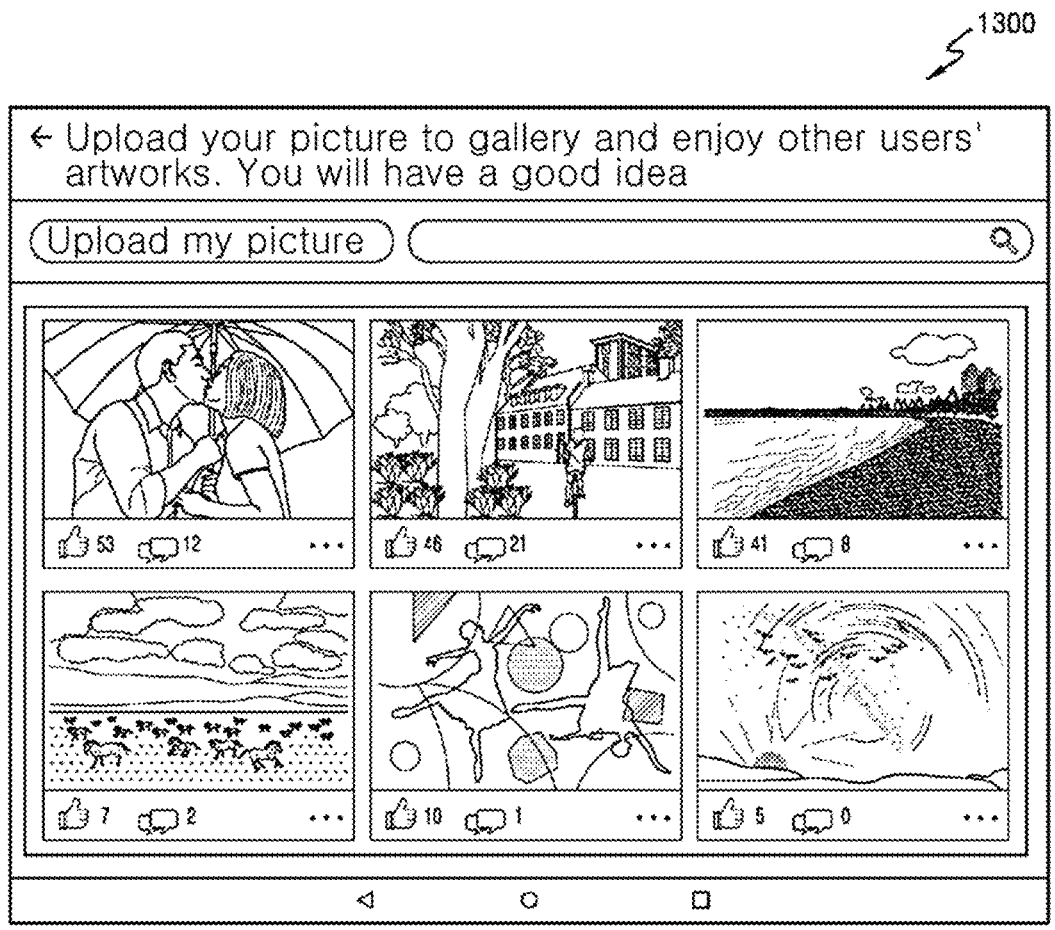
FIGS. 13 and 14 show an example of a pupil gallery unit as an embodiment of the present disclosure.
Figure 14:
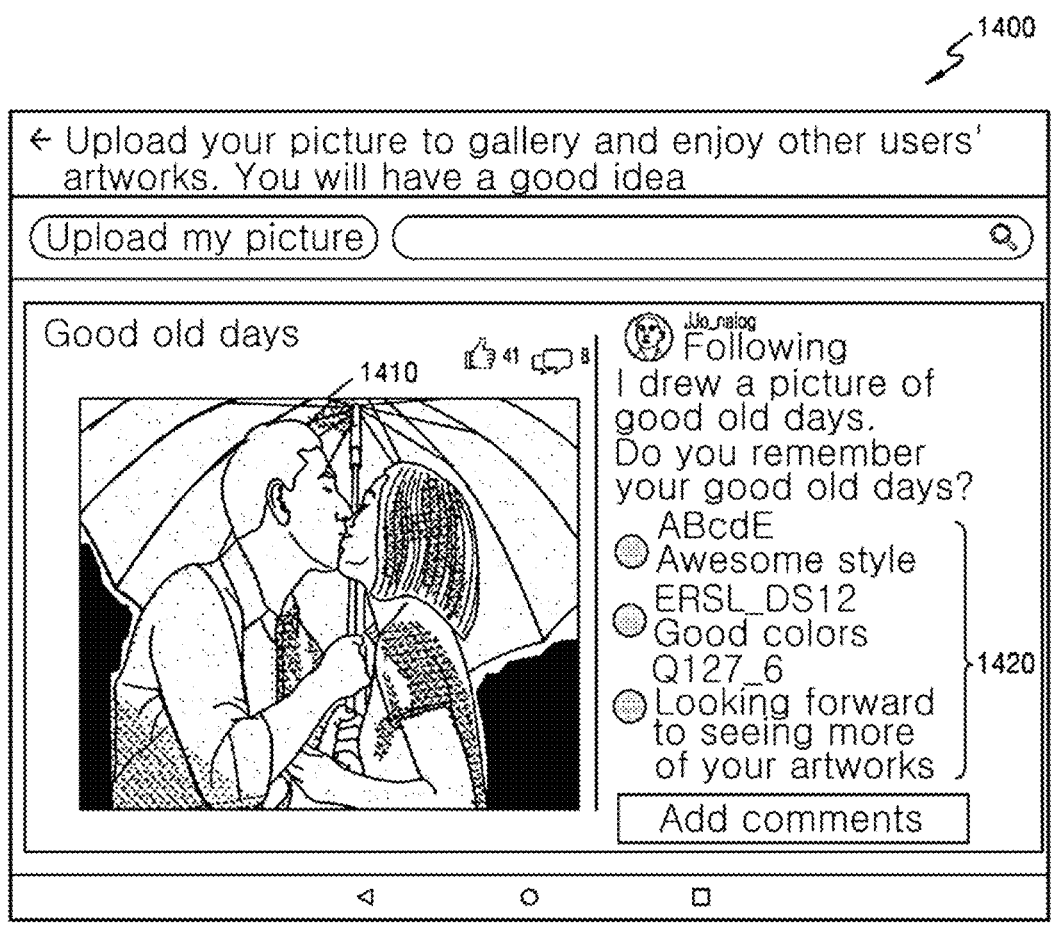

FIG. 12 shows an example of the portfolio unit as an embodiment of the present disclosure. The portfolio unit stores and displays the user's identification information as well as artworks created by the user, and provides an interface for receiving feedback from other user. Referring to FIG. 13, a pupil gallery unit 1300 stores various pupil artworks by artist. Additionally, the pupil gallery unit 1300 provides an interface for viewing other pupils' artworks and sending appreciation messages to the artworks. Referring to FIG. 14, a pupil gallery unit 1400 provides an interface that allows other pupil or an artist to leave a message 1420 on a pupil artwork 1410.

The learning unit 330 further includes a menu unit 331, and the menu unit 331 includes a first menu 332, a second menu 334, a third menu 336 and a fourth menu 338.

As an embodiment of the present disclosure, the first menu 332 is for learning of a first artist's painting or artwork, the second menu 334 is for learning of a second artist's painting or artwork, the third menu 336 is for learning of a third artist's painting or artwork, and the fourth menu 338 is for learning of a fourth artist's painting or artwork. In an example, when the user clicks the first menu 332, the first artist's artwork list may be provided, a video or slide of an artwork selected by the user from the artwork list may be displayed on the artist image providing unit (see 250 in FIG. 2), and the layout of the selected artwork may be displayed on the pupil learning unit (see 230 in FIG. 2) to learn the first artist's artwork.

The menus 332, 334, 336, 338 provided by the menu unit 331 may support various menus implemented as, for example, human figure, landscape, sketch, webtoon, or beginner, intermediate, advanced and expert.

The extension interface 340 further provides execution tools 352, 354, 356, 368 to support many functions when clicking. As in the example shown in FIG. 9, examples of many functions includes a user layer generation interface 352 for providing the draw or write interface, a call interface 354 for calling a program or related data, a photo interface 356 for supporting the photographing, and a gallery interface 368 for fetching the photo or image stored in the gallery. A termination interface 359 is clicked to go back to the extension interface 340 from the execution tools 352, 354, 356, 368.

FIGS. 4A and 4B show an example of the smart layer generated based on the elements of art as an embodiment of the present disclosure.

As an embodiment of the present disclosure, the elements of art include a point, a line, a shape, a form, a color, a light, texture or a volume, and color includes hue, luminance and saturation. In an embodiment of the present disclosure, at least one smart layer is generated using at least one of a plurality of elements that constitute the elements of art.

FIG. 4A shows an example of the smart layer 420 generated based on points 412 among the elements of art that make up the artist's artwork 410. The user may overlay the user layer (not shown) on the smart layer 420 and practice drawing the artist's artwork 410 along the points 412 displayed on the smart layer 420.

FIG. 4B shows an example of the smart layer 440 generated taking into account line, shape, form, color (hue, luminance, saturation) among the elements of art that make up the artist's artwork 430. The user may overlay at least one user layer (not shown) on the smart layer 440 and practice drawing the artist's artwork 430 along the picture displayed on the smart layer 440.

FIG. 5 shows an example of learning the artist style in the terminal for learning an artist's style as an embodiment of the present disclosure.

The terminal for learning an artist's style may display the artist image providing unit 510 on the first split screen and the pupil learning unit 520 on the second split screen, and separate the first split screen from the second split screen through the split line 522. The terminal for learning an artist's style further provides a learning execution tool interface 530 including a draw or write interface.

The learning execution tool interface 530 includes a sketch interface 531, a figure select interface 532, an area selection interface 533, a convert-to-text interface 534, a no-background interface 535 for supporting the toggle function to make the smart layer disappear, a background selection interface 536 for selecting an image from the gallery of the terminal, a replay interface 537 for replaying a video, a color mode interface 540 for coloring in the user layer, a fetch interface 541 for fetching various files other than the stored user layer or smart layer, a program interface 542 for fetching or running a program, an initialization interface 543 for initializing all the settings set by the user or the user's task and a storage interface 544. The color mode interface 540 can be extended when activated in the same way as a color mode detail interface (640 in FIG. 6). The storage interface 544 may selectively store a desired user layer among at least one user layer, and store it as a pupil artwork in the portfolio unit (320 in FIG. 3).

Figure 6:
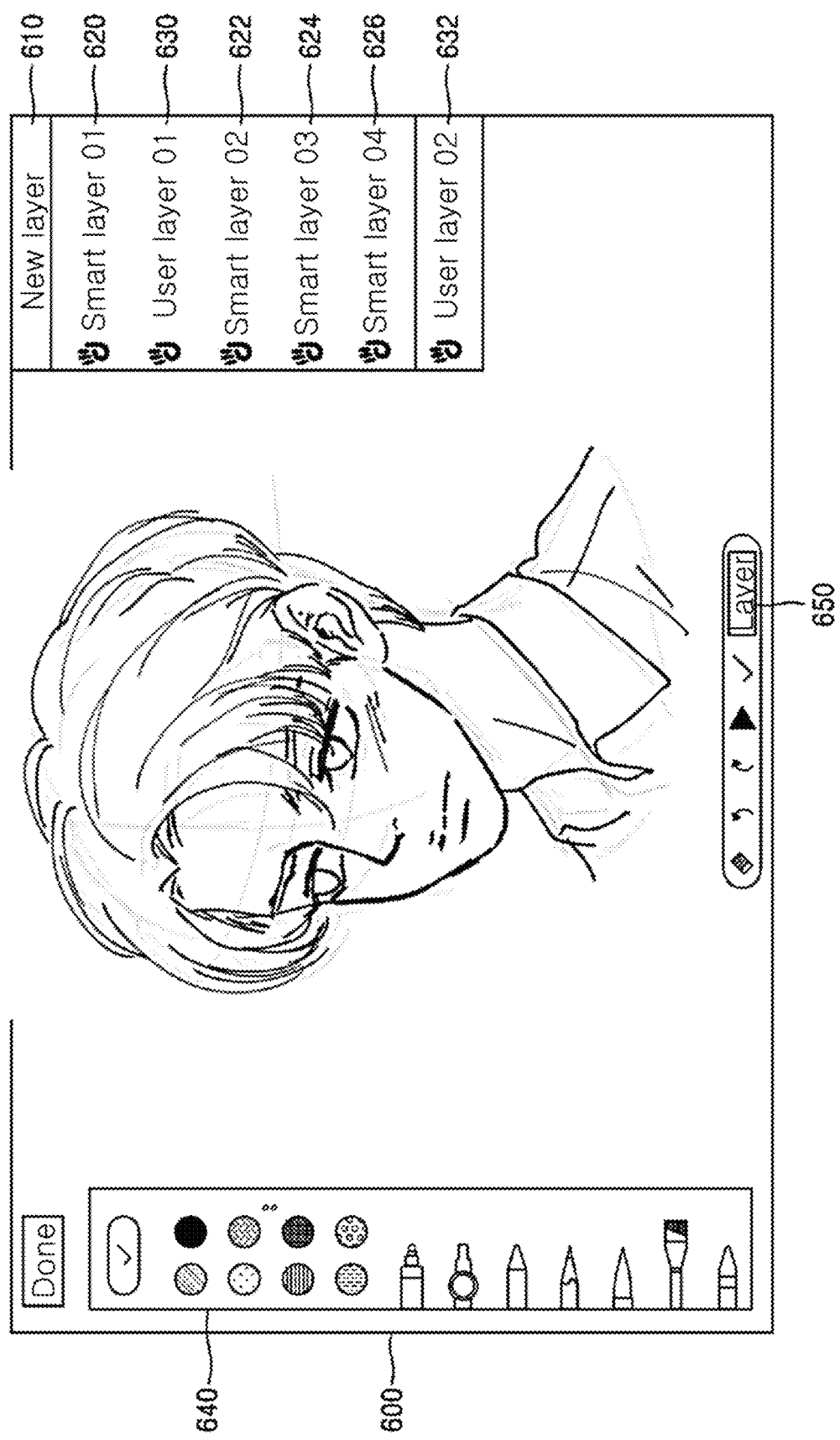
FIG. 6 shows an example of a process of learning an artist's style based on layout information displayed on a smart layer as another embodiment of the present disclosure.

FIG. 6 shows another embodiment of the pupil learning unit as another embodiment of the present disclosure. In an embodiment of the present disclosure, the display 600 may be implemented to display only the pupil learning unit.

In FIG. 6, the user may fetch the smart layer 01 620 having the displayed sketch at the lower part, overlay the user layer 01 630, and draw along the sketch in the user layer 01 630. Subsequently, the user may further fetch and overlay the smart layer 02 622, the smart layer 03 624 and the smart layer 04 626, and then the user layer 02 632 thereon again. In this case, the smart layer 02 622 may be a layer displaying only luminance information among the element information of the selected artist's artwork, the smart layer 03 624 may be a layer displaying only saturation information among the element information of the selected artist's artwork, and the smart layer 04 626 may be a layer displaying only volume information among the element information of the selected artist's artwork. The user may learn to draw, write or the like along the guide information displayed on the smart layer 02 622, the smart layer 03 624 and the smart layer 04 626 in the user layer 02 632.

As in an embodiment of FIG. 6, when the user uses the plurality of smart layers 620, 622, 624, 626 and the plurality of user layers 630, 632, the user may selectively make some or all of the plurality of smart layers 620, 622, 624, 626 and some or all of the user layers 630, 632 visible or invisible using a layer change interface unit 650.

For example, when the user needs layer information displaying only luminance information among the element information of the selected artist's artwork, the user may change to make the smart layer 03 624 and the smart layer 04 626 invisible in the example shown in FIG. 6. Additionally, when the user completes an artwork in the user layer 02 632, the user may change to make the smart layers 620, 622, 624, 626 and the user layer 01 630 invisible so that only the user layer 02 632 may be finally displayed.

When the user wants to add a layer, the user may add a smart layer or a user layer using a layer interface 610. The pupil learning unit may activate the interface 640 related to the draw function in the user layer.

FIGS. 7 to 10 show four modes of the terminal for learning an artist's style as a preferred embodiment of the present disclosure.

Figure 7:
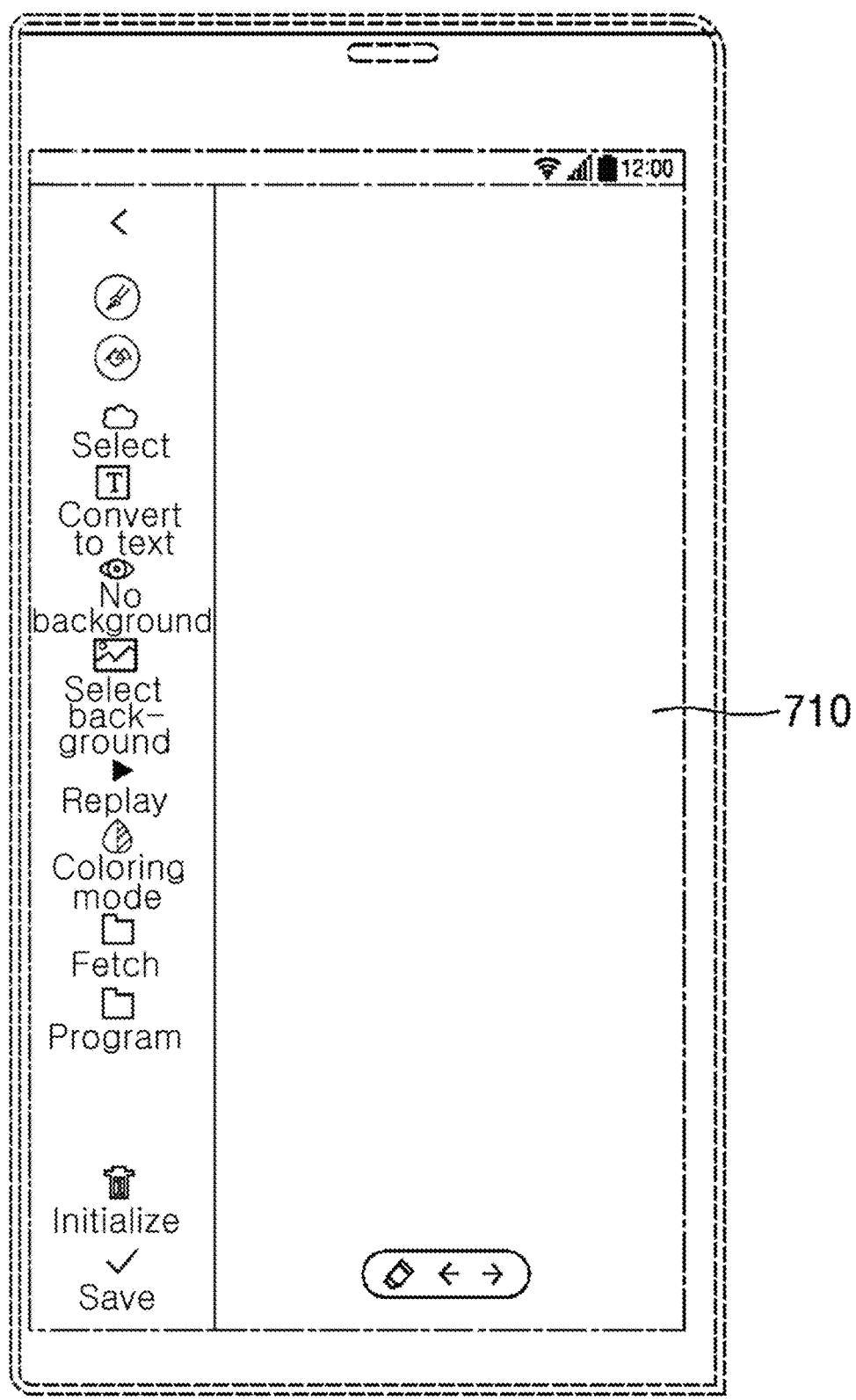
FIGS. 7 to 10 show four modes of a terminal for learning an artist's style as an embodiment of the present disclosure.

FIG. 7 shows the mode change interface unit in an inactivated mode, and the user may display only the pupil learning unit 710 on the display as in the embodiment shown in FIG. 6.

Figure 8:
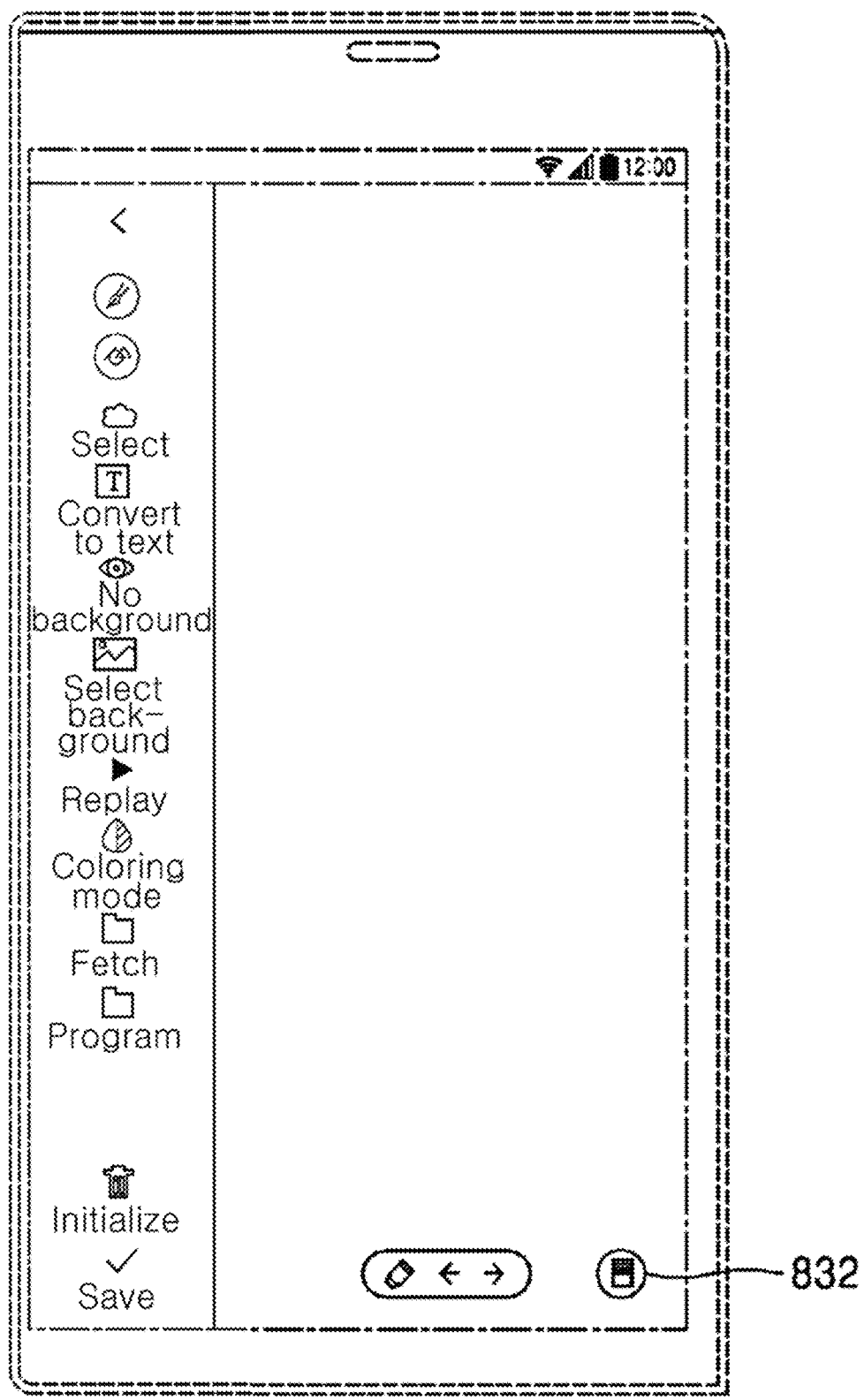

FIGS. 8 to 10 show the mode change interface unit 832, 932, 1032 in an activated mode. When the mode change interface unit is activated and changed from FIG. 7 to FIG. 8, the user may display the artist image providing unit on the display as in FIG. 9 or 10.

After the mode change interface unit 832 is activated as in the embodiment of FIG. 8, the display location of the artist image providing unit 942, 1052 may changes as in FIG. 9 or 10 or disappear according to the number of touches or the touch time on the mode change interface unit 832, 932, 1032. Additionally, when the display location of the artist image providing unit 942, 1052 changes, the shape of the mode change interface unit 932 1032 changes accordingly.

Referring to FIG. 10, when the artist image providing unit 1052 provides a video, the artist image providing unit 1052 may further provide a function bar 1060 for replaying 1061 the video, a timeline bar 1062 for indicating the timestamp of the video, a speed control function 1063 for controlling the playback speed of the video, and a zoom interface 1062 for enlarging or reducing the size of the video.

Figure 11:
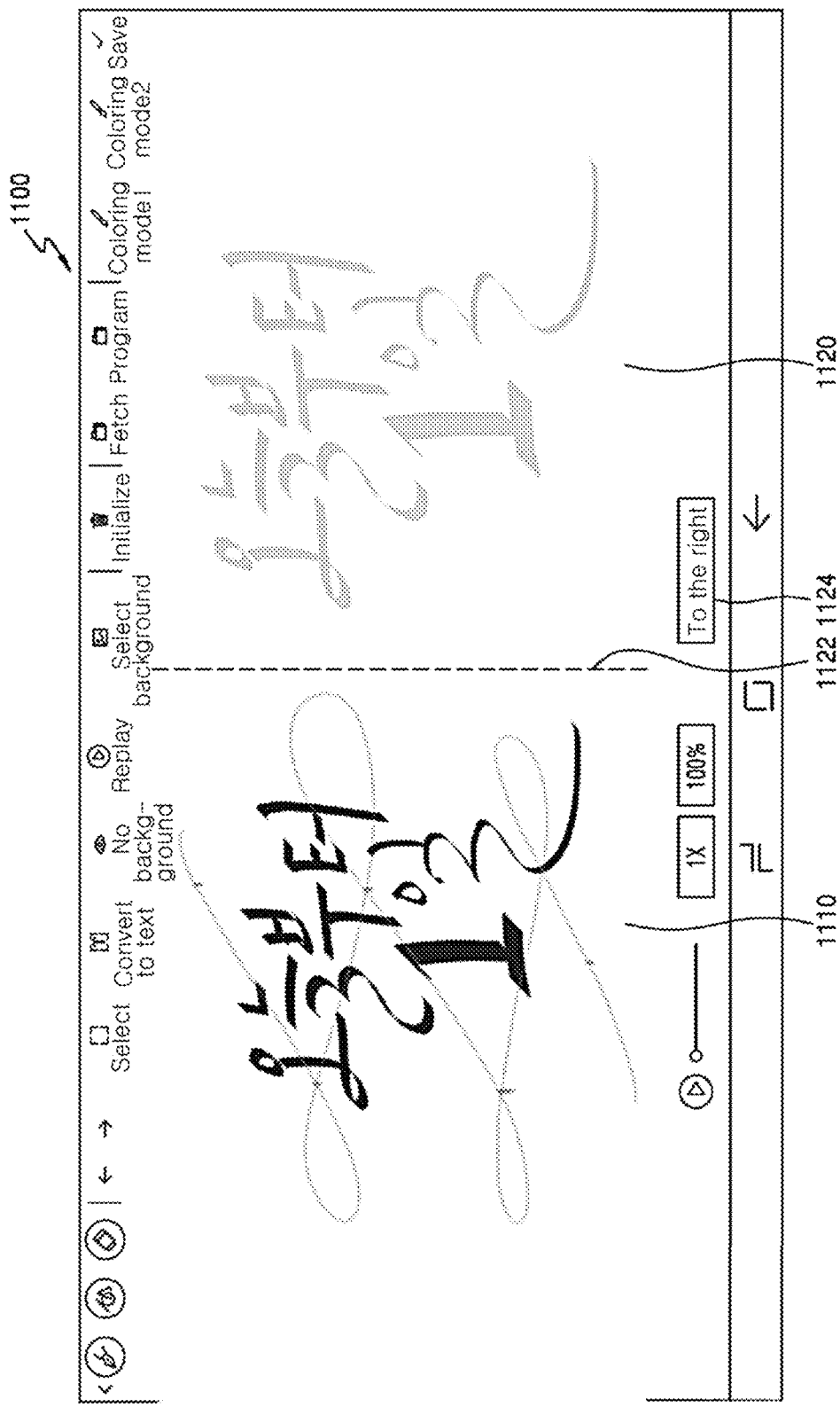

FIG. 11 shows an example in which the selected artist's artwork is calligraphy as another embodiment of the present disclosure. The example shows that the video 1110 is played on the first screen of the terminal 1100, and the smart layer 1120 related to the elements of art of the video 1110 being played is provided on the second screen with respect to the split line 1122.

The pupil learning unit further provides a zoom interface 1124 for enlarging the smart layer 1120 or the user layer (not shown). The user may enlarge or reduce the smart layer 1120 or the user layer using the zoom interface 1124.

The steps of method or algorithm described in relation to the embodiments of the present disclosure may be performed directly by hardware or a software module executed by hardware, or may be performed by a combination of hardware and software. The software module may be reside in random access memory (RAM), read only memory (ROM), erasable programmable ROM (EPROM), electrically erasable programmable ROM (EEPROM), flash memory, hard disk, removable disk, CD-ROM, or any type of computer readable recording media well known in the technical field pertaining to the present disclosure.

While the embodiments of the present disclosure have been hereinabove described with reference to the accompanying drawings, those skilled in the art will understand that the present disclosure may be embodied in other specific forms without changing the technical spirit or the essential features of the present disclosure. Therefore, it should be understood that the embodiments described hereinabove are provided by way of illustration in all aspect, but not intended to be limiting of this disclosure.

What is claimed is:

1. A terminal for learning an artist's style, comprising:
an artist image providing unit to display an artist's content selected from an artist database unit in which at least one content created for each artist is stored;
a pupil learning unit in which a plurality of smart layers and a plurality of user layers are overlaid and displayed, the plurality of smart layers generated based on different types of elements of art that collectively make up the selected artist's content, the plurality of user layers providing an interface for recognizing a user input and supporting writing or drawing, wherein a first user layer from the plurality of user layers is overlaid on a first smart layer from the plurality of smart layers, and a second smart layer from the plurality of smart layers or a second user layer from the plurality of user layers is overlaid and displayed on the first user layer; and
a display unit to display the selected artist's content in the artist image providing unit on a first split screen, and the pupil learning unit on a second split screen;
wherein when the pupil learning unit uses the plurality of smart layers including the first smart layer and the second smart layer, each of the first smart layer and the second smart layer among the plurality of smart layers displays a different type of element of art from the plurality of different types of elements of art that make up the selected artist's content, and a first type of element of art from the different types of elements displayed in the first smart layer and a second type of element of art displayed in the second smart layer that is different from the first type of element of art, and the first type of element of art and the second type of element of art each corresponding to one of a point type element, a line type element, a shape type element, a form type element, a color type element, a light type element, a texture type element, or a volume type element, and
the pupil learning unit is configured to activate the first smart layer and the first user layer and deactivate the second smart layer and the second user layer responsive to a first user request such that the first user layer recognizes a first user input corresponding to the first type of element of art displayed in the first smart layer, and is configured to activate the second smart layer and the second user layer and deactivate the first smart layer and the first user layer responsive to a second user request such that the second user layer recognizes a second user input corresponding to the second type of element of art displayed in the second smart layer.

2. The terminal for learning an artist's style according to claim 1, wherein the at least one content includes a picture, a painting, a cartoon, a webtoon or calligraphy.

3. The terminal for learning an artist's style according to claim 1, wherein the selected artist's content includes a video generated by recording an artwork creating process of the selected artist, or a slide generated by time-sequentially recording an artwork creating process of the selected artist.

4. The terminal for learning an artist's style according to claim 3, wherein the wherein the plurality of smart layers further include a third smart layer including a layout generated by referring to feature points extracted from an image at a specific time of the video or the slide.

5. The terminal for learning an artist's style according to claim 4, wherein the wherein the plurality of smart layers further include a fourth smart layer including pattern information recognized in the feature points extracted from the video or the slide, and the pattern information is recognized through machine learning.

6. A method for learning an artist's style, comprising:
displaying, by an artist image providing unit, an artist's content selected from an artist database unit in which at least one content created for each artist is stored;
overlaying and displaying, by a pupil learning unit, a plurality of smart layers and a plurality of user layers, the plurality of smart layers generated based on different types of elements of art that collectively make up the selected artist's content, the plurality of user layers providing an interface for recognizing a user input and supporting writing or drawing, wherein a first user layer from the plurality of user layers is overlaid on a first smart layer from the plurality of smart layers, and a second smart layer from the plurality of smart layers or a second user layer from the plurality of user layers is overlaid and displayed on the first user layer;
displaying, by a display unit, the selected artist's content in the artist image providing unit on a first split screen, and the pupil learning unit on a second split screen, wherein when the pupil learning unit uses the plurality of smart layers including the first smart layer and the second smart layer, each of the first smart layer and the second smart layer among the plurality of smart layers displays a different type of element of art that make up the selected artist's content, and a first type of element of art from the different types of elements displayed in the first smart layer and a second type of element of art displayed in the second smart layer that is different from the first type of element of art, and the first type of element of art and the second type of element of art each corresponding to one of a point type element, a line type element, a shape type element, a form type element, a color type element, a light type element, a texture type element or a volume type element, and the pupil learning unit controls a write or draw interface to be inactivated in part or in whole for the plurality of smart layers, and to be only activated for the user layer,
activating the first smart layer and the first user layer and deactivating the second smart layer and the second user layer responsive to a first user request such that the first user layer recognizes a first user input corresponding to the first type of element of art displayed in the first smart layer; and
activating the second smart layer and the second user layer and deactivating the first smart layer and first user layer responsive to a second user request such that the second user layer recognizes a second user input corresponding to the second type of element of art displayed in the second smart layer.

7. The method according to claim 6, further comprising:
storing the user layer or the another user layer as a pupil artwork in a portfolio unit; and
sharing the pupil artwork through at least one of a pupil gallery unit, social network service (SNS) or short message service (SMS).

8. The method according to claim 7, further comprising storing a layout generated by referring to feature points extracted from an image at a specific time of a video or a slide displayed on a third smart layer in the pupil learning unit and a recording of a learning process in which a user learns along the layout displayed on the third smart layer using the interface provided in the user layer.

9. The method according to claim 7, wherein the pupil gallery unit displays feedback from an original artist or other pupils for each pupil artwork.

* * * * *